(12) United States Patent
Yuwaki et al.

(10) Patent No.: US 11,701,837 B2
(45) Date of Patent: *Jul. 18, 2023

(54) THREE-DIMENSIONAL SHAPING APPARATUS AND CONTROL METHOD FOR THREE-DIMENSIONAL SHAPING APPARATUS

(71) Applicant: SEIKO EPSON CORPORATION, Tokyo (JP)

(72) Inventors: Kohei Yuwaki, Shiojiri (JP); Koichi Saito, Matsumoto (JP); Kazuhide Nakamura, Asahi (JP)

(73) Assignee: SEIKO EPSON CORPORATION

( * ) Notice: Subject to any disclaimer, the term of this patent is extended or adjusted under 35 U.S.C. 154(b) by 0 days.

This patent is subject to a terminal disclaimer.

(21) Appl. No.: 17/866,654

(22) Filed: Jul. 18, 2022

(65) Prior Publication Data

US 2022/0347934 A1 Nov. 3, 2022

Related U.S. Application Data

(63) Continuation of application No. 16/690,342, filed on Nov. 21, 2019, now Pat. No. 11,534,976.

(30) Foreign Application Priority Data

Nov. 22, 2018 (JP) ................................ 2018-219000

(51) Int. Cl.
*G05B 19/18* (2006.01)
*B29C 64/393* (2017.01)
(Continued)

(52) U.S. Cl.
CPC .......... *B29C 64/393* (2017.08); *B29C 64/209* (2017.08); *B29C 64/35* (2017.08);
(Continued)

(58) Field of Classification Search
CPC ..... B29C 64/393; B29C 64/209; B29C 64/35; B29C 64/118; B33Y 30/00; B33Y 40/00;
(Continued)

(56) References Cited

U.S. PATENT DOCUMENTS

| 2014/0291886 A1 | 10/2014 | Mark et al. |
| 2016/0106142 A1 | 4/2016 | Contractor et al. |

(Continued)

FOREIGN PATENT DOCUMENTS

| CN | 108032519 A | 5/2018 |
| JP | 2006-192710 A | 7/2006 |

(Continued)

*Primary Examiner* — Alicia M. Choi
(74) *Attorney, Agent, or Firm* — Harness, Dickey & Pierce, P.L.C.

(57) ABSTRACT

A three-dimensional shaping apparatus includes a melting section providing a shaping material to a channel, a nozzle ejecting the shaping material to a shaping region of a shaping table, an ejection-amount adjusting mechanism adjusting an amount of the shaping material from the nozzle, a suction member sucking the shaping material in the channel, a memory configured to store a program, and a processor configured to execute the program so as to control the three-dimensional shaping apparatus. The processor is configured to stop the ejection of the shaping material and, thereafter, prior to resumption of the ejection of the shaping material, execute material purge processing for discharging the shaping material remaining in the melting section to a region different from the shaping region. The suction member is located closer to the nozzle than the ejection-amount adjusting mechanism in the first channel.

8 Claims, 10 Drawing Sheets

(51) Int. Cl.
  *B33Y 30/00* (2015.01)
  *B33Y 50/02* (2015.01)
  *B29C 64/35* (2017.01)
  *B33Y 40/00* (2020.01)
  *B29C 64/209* (2017.01)

(52) U.S. Cl.
  CPC ............... *B33Y 30/00* (2014.12); *B33Y 40/00* (2014.12); *B33Y 50/02* (2014.12); *G05B 19/182* (2013.01); *G05B 2219/49007* (2013.01)

(58) Field of Classification Search
  CPC .................. B33Y 50/02; G05B 19/182; G05B 2219/49007
  See application file for complete search history.

(56) References Cited

U.S. PATENT DOCUMENTS

| | | |
|---|---|---|
| 2017/0008230 A1 | 1/2017 | Yuyama |
| 2017/0066187 A1 | 3/2017 | Mark et al. |
| 2017/0157828 A1* | 6/2017 | Mandel ................. B29C 48/21 |
| 2017/0210069 A1 | 7/2017 | Stubenruss |
| 2017/0252851 A1* | 9/2017 | Fulop ..................... B33Y 10/00 |
| 2018/0111319 A1 | 4/2018 | Brezoczky et al. |
| 2018/0281284 A1* | 10/2018 | Elgar ..................... B29C 64/371 |
| 2019/0022934 A1* | 1/2019 | Kobe ..................... B29C 64/245 |
| 2019/0118258 A1 | 4/2019 | Sachs et al. |
| 2019/0118475 A1* | 4/2019 | Chanclon ............... B33Y 40/00 |
| 2019/0232550 A1 | 8/2019 | Mark et al. |
| 2019/0232566 A1* | 8/2019 | Bosveld ................ B33Y 50/02 |
| 2019/0375148 A1* | 12/2019 | Susnjara ................ B33Y 10/00 |
| 2020/0262148 A1 | 8/2020 | Sebal et al. |
| 2021/0154910 A1* | 5/2021 | Cheng ................... B29C 64/336 |
| 2021/0206085 A1 | 7/2021 | Rode et al. |
| 2022/0001587 A1 | 1/2022 | Mark et al. |

FOREIGN PATENT DOCUMENTS

| | | |
|---|---|---|
| JP | 2009-137560 A | 6/2009 |
| JP | 2010-241016 A | 10/2010 |
| JP | 2016-518267 A | 6/2016 |
| JP | 2016-215581 A | 12/2016 |
| JP | 2017-523934 A | 8/2017 |
| JP | 2018-130836 A | 8/2018 |
| WO | 2015-129733 A1 | 9/2015 |

* cited by examiner

THREE-DIMENSIONAL SHAPING APPARATUS AND CONTROL METHOD FOR THREE-DIMENSIONAL SHAPING APPARATUS

CROSS-REFERENCE TO RELATED APPLICATIONS

This is a continuation of U.S. application Ser. No. 16/690,342 filed Nov. 21, 2019 which is based on, and claims priority from, JP Application Serial Number 2018-219000, filed Nov. 22, 2018, the disclosures of which are hereby incorporated by reference herein in their entireties.

BACKGROUND

1. Technical Field

The present disclosure relates to a three-dimensional shaping apparatus and a control method for the three-dimensional shaping apparatus.

2. Related Art

For example, JP-A-2006-192710 (Patent Literature 1) discloses a three-dimensional shaping apparatus that extrudes a melted thermoplastic material from an extrusion nozzle, which is scanned according to preset shape data, onto a base and further stacks a melted material on the material hardened on the base to create a three-dimensional shaped object.

In the three-dimensional shaping apparatus explained above, the present inventors found that, when ejection of the material from the nozzle is resumed after being stopped for a long time, it is likely that the material remaining in a melting section is denatured by heat or oxidation and affects the quality of the three-dimensional shaped object. Therefore, an object of the present disclosure is to suppress deterioration in the quality of the three-dimensional shaped object even in such a case.

SUMMARY

According to an aspect of the present disclosure, a three-dimensional shaping apparatus is provided. The three-dimensional shaping apparatus includes: a melting section configured to melt a material into a shaping material; a first channel communicating with the melting section, the shaping material flowing through the first channel; a nozzle communicating with the first channel and configured to eject the shaping material; an ejection-amount adjusting mechanism provided in the first channel and configured to adjust an ejection amount of the shaping material from the nozzle; a shaping table on which the shaping material ejected from the nozzle is stacked; a moving mechanism configured to change relative positions of the nozzle and the shaping table; and a control section configured to control the melting section, the ejection-amount adjusting mechanism, and the moving mechanism to thereby shape a three-dimensional shaped object in a shaping region of the shaping table. Within a period in which the three-dimensional shaped object is shaped, the control section controls the ejection-amount adjusting mechanism to thereby stop the ejection of the shaping material from the nozzle and, thereafter, prior to resumption of the ejection of the shaping material from the nozzle to the shaping region, controls the melting section and the ejection-amount adjusting mechanism to thereby execute material purge processing for discharging the shaping material remaining in the melting section to a region different from the shaping region.

DESCRIPTION OF EXEMPLARY EMBODIMENTS

A. First Embodiment

Figure 1:
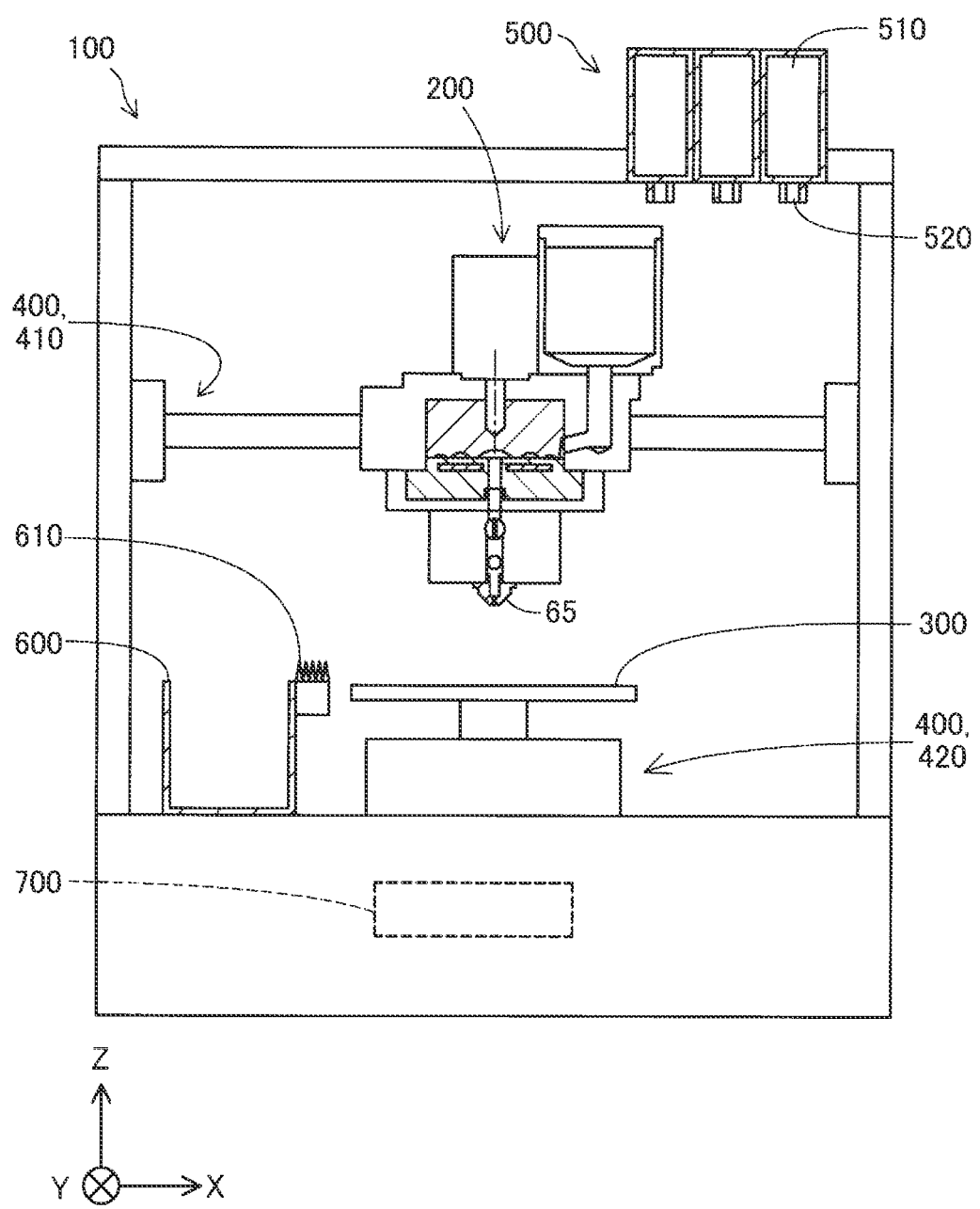
FIG. 1 is an explanatory diagram showing a schematic configuration of a three-dimensional shaping apparatus in a first embodiment.

FIG. 1 is an explanatory diagram showing a schematic configuration of a three-dimensional shaping apparatus 100 in a first embodiment. The three-dimensional shaping apparatus 100 in this embodiment includes an ejection unit 200, a shaping table 300, a moving mechanism 400, a material supplying mechanism 500, a waste-material storing section 600, and a control section 700. Under control by the control section 700, while ejecting a shaping material from a nozzle 65 provided in the ejection unit 200 toward the shaping table 300, the three-dimensional shaping apparatus 100 changes, with the moving mechanism 400, relative positions of the nozzle 65 and the shaping table 300 to thereby shape a three-dimensional shaped object having a desired shape on the shaping table 300. A detailed configuration of the ejection unit 200 is explained below with reference to FIG. 2.

The moving mechanism 400 moves each of the ejection unit 200 and the shaping table 300 to thereby change three-dimensional relative positions of the nozzle 65 and the shaping table 300. In this embodiment, the moving mechanism 400 is configured by a first moving mechanism 410 that moves the ejection unit 200 and a second moving mechanism 420 that moves the shaping table 300. The first moving mechanism 410 is configured to be capable of moving the ejection unit 200 in two axial directions of an X direction and a Y direction. The second moving mechanism 420 is configured to be capable of moving the shaping table 300 in a Z direction. The first moving mechanism 410 moves the ejection unit 200 with a driving force of a motor. The second moving mechanism 420 moves the shaping table 300 with a driving force of a motor. The motors are driven under the control by the control section 700.

The material supplying mechanism 500 is provided above the ejection unit 200 in the three-dimensional shaping apparatus 100. The material supplying mechanism 500 supplies a material used for shaping of a three-dimensional shaped object to the ejection unit 200 moved to below the material supplying mechanism 500 by the first moving mechanism 410. The material supplying mechanism 500 includes a plurality of sets of storage sections 510 that store materials and supply ports 520 provided below the storage sections 510. ON and OFF of the supply of the materials is switched by opening and closing of the supply ports 520. For example, the supply ports 520 are opened and closed by shutters opened and closed by motors driven under the control by the control section 700.

In this embodiment, different kinds of materials are respectively stored in a plurality of storage sections 510. For example, a material forming a shaping material of a three-dimensional shaped object, a support material, which is a material for retaining the shape of the three-dimensional shaped object, and a purge material, which is a material for removing the shaping material and carbides remaining in the ejection unit 200, are stored in the storage sections 510. The ejection unit 200 receives supply of a desired material from the supply port 520 of the storage section 510 that stores the desired material. The material supplying mechanism 500 is sometimes referred to as support-material supplying mechanism and purge-material supplying mechanism as well. As the purge material, a cleaning agent obtained by mixing an additive in polyolefin resin can be used and polypropylene resin and the like can be used. The purge material is used, for example, when an old shaping material in the ejection unit 200 is replaced with a new shaping material or when a shaping material in the ejection unit 200 is replaced with a shaping material of a different type. The purge material is discharged from the nozzle 65 after the shaping material in the ejection unit 200 is replaced.

The waste-material storing section 600 is provided adjacent to the shaping table 300. In this embodiment, the waste-material storing section 600 is a box opened upward. The waste-material storing section 600 stores the shaping material discharged from the nozzle 65 of the ejection unit 200 moved to above the waste-material storing section 600 by the first moving mechanism 410. The waste-material storing section 600 may store the support material and the purge material discharged from the nozzle 65 besides the shaping material discharged from the nozzle 65.

In this embodiment, a nozzle cleaning member 610 for cleaning the tip portion of the nozzle 65 is provided in an outer circumferential portion of an opening in the waste-material storing section 600. The nozzle cleaning member 610 in this embodiment is a brush disposed with bristle ends facing upward. The nozzle cleaning member 610 may be a sheet made of resin or synthetic leather.

The control section 700 is configured by a computer including one or more processors, a main storage device, and an input and output interface that performs input and output of signals from and to the outside. In this embodiment, the processors execute programs and commands read onto the main storage device, whereby the control section 700 exerts various functions. The control section 700 may be configured by a combination of a plurality of circuits rather than by the computer.

Figure 2:
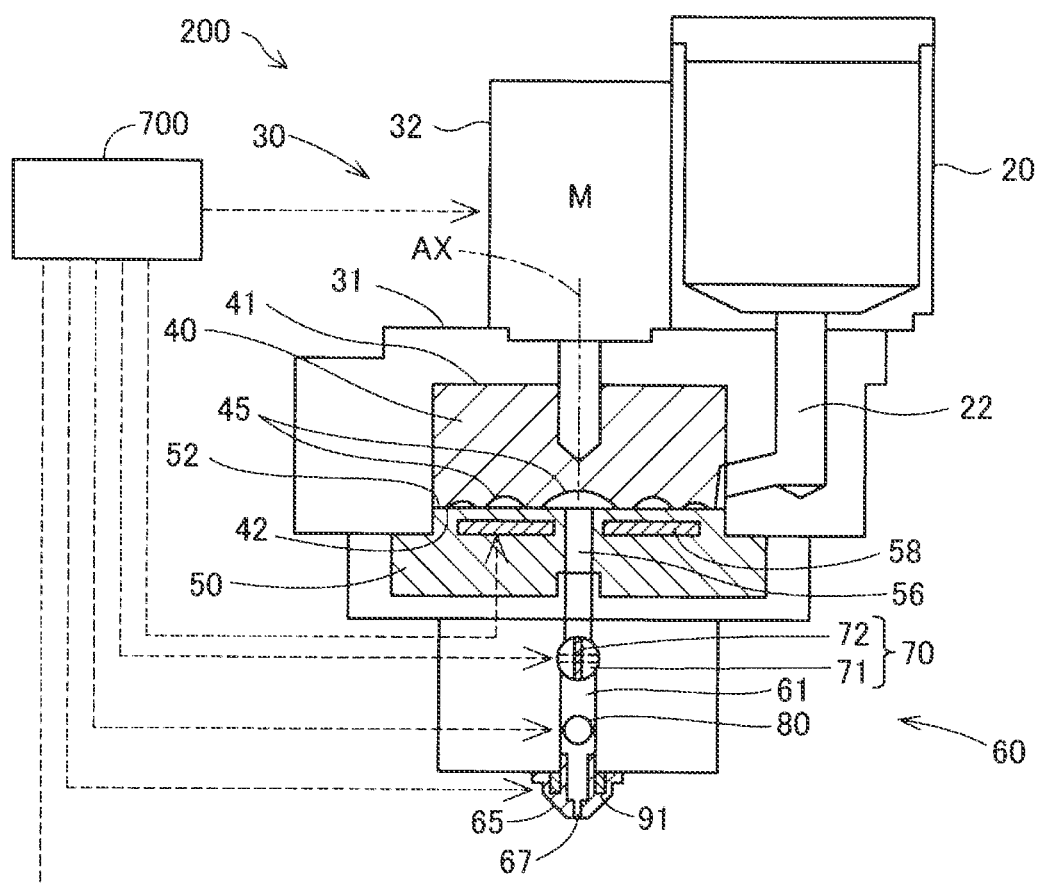
FIG. 2 is an explanatory diagram showing a schematic configuration of an ejection unit in the first embodiment.

FIG. 2 is an explanatory diagram showing a schematic configuration of the ejection unit 200 in this embodiment. The ejection unit 200 in this embodiment includes a material storage section 20, a melting section 30, an ejecting section 60, and a suction section 80.

The material storage section 20 stores a material in a state of pellets or powder supplied from the material supplying mechanism 500. The material in this embodiment is pellet-like ABS resin. The material storage section 20 in this embodiment is configured by a hopper. The material storage section 20 and the melting section 30 are coupled by a supply path 22 provided below the material storage section 20. The material stored in the material storage section 20 is supplied to the melting section 30 via the supply path 22.

The melting section 30 includes a screw case 31, a driving motor 32, a flat screw 40, and a barrel 50. The melting section 30 melts at least a part of a material in a solid state, which is supplied from the material storage section 20, into a paste-like shaping material having fluidity and supplies the shaping material to the nozzle 65. The flat screw 40 is sometimes simply referred to as screw as well.

The screw case 31 is a housing that houses the flat screw 40. The driving motor 32 is fixed on the upper surface of the screw case 31. The driving motor 32 is coupled to an upper surface 41 of the flat screw 40.

The flat screw 40 has a substantially columnar shape, the height of which in a direction along a center axis AX is smaller than the diameter thereof. The flat screw 40 is disposed in the screw case 31 such that the center axis AX is parallel to the Z direction. The flat screw 40 rotates around the center axis AX in the screw case 31 with torque generated by the driving motor 32.

The flat screw 40 includes a groove forming surface 42 on the opposite side of the upper surface 41 in the direction along the center axis AX. A groove section 45 is formed on the groove forming surface 42. A detailed shape of the groove forming surface 42 of the flat screw 40 is explained below with reference to FIG. 4.

The barrel 50 is provided below the flat screw 40. The barrel 50 includes a screw counter surface 52 opposed to the groove forming surface 42 of the flat screw 40. In the barrel 50, a heater 58 is incorporated in a position opposed to the groove section 45 of the flat screw 40. The temperature of the heater 58 is controlled by the control section 700. The heater 58 is sometimes referred to as heating section.

A communication hole 56 is provided in the center of the screw counter surface 52. The communication hole 56 communicates with the ejecting section 60. A detailed shape of the screw counter surface 52 of the barrel 50 is explained below with reference to FIG. 5.

The ejecting section 60 includes a first channel 61, an ejection-amount adjusting mechanism 70, and the nozzle 65. The first channel 61 communicates with the communication hole 56 of the melting section 30. The shaping material supplied from the melting section 30 flows through the first channel 61. The nozzle 65 communicates with the first channel 61. The shaping material is supplied to the nozzle 65 via the first channel 61. The nozzle 65 ejects the shaping material from a nozzle hole 67 provided at the tip portion of the nozzle 65. In this embodiment, a nozzle heater 91 that heats the nozzle 65 is provided in the ejecting section 60. The temperature of the nozzle heater 91 is controlled by the control section 700. In order to improve the fluidity of the shaping material in the nozzle 65, the temperature of the nozzle heater 91 is set higher than the temperature of the heater 58 of the barrel 50.

The ejection-amount adjusting mechanism 70 is provided in the first channel 61. The ejection-amount adjusting mechanism 70 changes the channel resistance of the first channel 61 to thereby adjust an ejection amount of the shaping material from the nozzle 65. The ejection-amount adjusting mechanism 70 in this embodiment is configured by a butterfly valve. The ejection-amount adjusting mechanism 70 in this embodiment includes a driving shaft 71, which is a shaft-like member, and a tabular valve body 72 that rotates according to the rotation of the driving shaft 71. The driving shaft 71 is disposed such that a direction along the center axis of the driving shaft 71 and a flowing direction of the shaping material in the first channel 61 cross. The valve body 72 is disposed to traverse the first channel 61. The driving shaft 71 is rotated by a motor driven under the control by the control section 700. As shown in FIG. 2, in a state in which the tabular surface of the valve body 72 is parallel to the flowing direction of the shaping material in the first channel 61, the shaping material is ejected from the nozzle 65 because the melting section 30 and the nozzle 65 are in a communication state. The driving shaft 71 rotates around the center axis, whereby the valve body 72 rotates in the first channel 61. A channel sectional area of the first channel 61 changes according to a rotation angle of the valve body 72. The ejection amount of the shaping material from the nozzle 65 decreases according to a decrease in the channel sectional area of the first channel 61. As indicated by a broken line in FIG. 2, in a state in which the tabular surface of the valve body 72 is perpendicular to a flowing direction of the shaping material in the first channel 61, in other words, a state in which the channel sectional area of the first channel 61 is reduced to zero by the valve body 72, the ejection of the shaping material from the nozzle 65 is stopped because the melting section 30 and the nozzle 65 are in a non-communication state.

In this embodiment, the suction section 80 is provided between the ejection-amount adjusting mechanism 70 and the nozzle 65 in the first channel 61.

Figure 3:
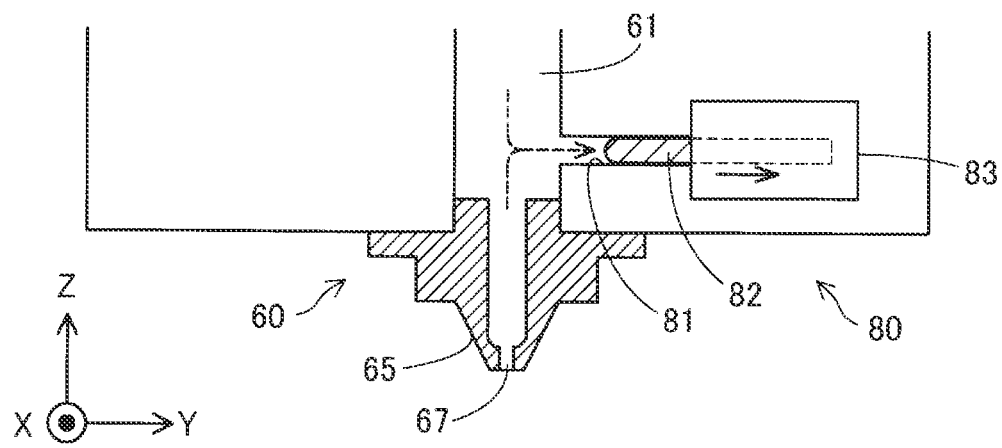
FIG. 3 is an explanatory diagram showing a schematic configuration of a suction section in the first embodiment.

FIG. 3 is an explanatory diagram showing a schematic configuration of the suction section 80. In this embodiment, the suction section 80 includes a cylindrical cylinder 81 coupled to the first channel 61, a plunger 82 housed in the cylinder 81, and a plunger driving section 83 that drives the plunger 82. In this embodiment, the plunger driving section 83 is configured by a motor driven under the control by the control section 700 and a rack and pinion that converts rotation of the motor into movement in a translational direction along the axial direction of the cylinder 81. The plunger driving section 83 may be configured by the motor driven under the control by the control section 700 and a ball screw that converts the rotation of the motor into the movement in the translational direction along the axial direction of the cylinder 81 or may be configured by an actuator such as a solenoid mechanism or a piezoelectric element.

As indicated by using arrows in FIG. 3, when the plunger 82 moves in a direction away from the first channel 61, since negative pressure is generated in the cylinder 81, the shaping material in the first channel 61 to the nozzle 65 is sucked into the cylinder 81. On the other hand, when the plunger 82 moves in a direction of approach to the first channel 61, the shaping material in the cylinder 81 is extruded to the first channel 61 by the plunger 82.

Figure 4:
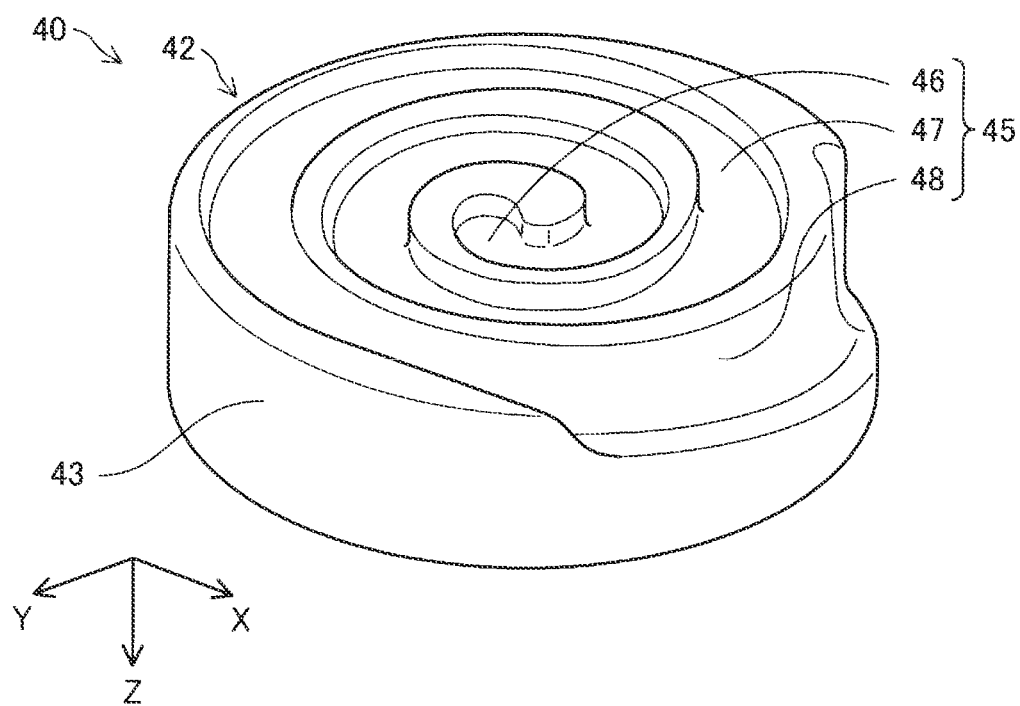
FIG. 4 is a perspective view showing the configuration of a groove forming surface of a flat screw in the first embodiment.

FIG. 4 is a perspective view showing the configuration of the groove forming surface 42 of the flat screw 40 in this embodiment. To facilitate understanding of the technique, the flat screw 40 shown in FIG. 4 is shown in a state in which a vertical positional relation shown in FIG. 2 is reversed. As explained above, the groove section 45 is formed on the groove forming surface 42 of the flat screw 40. The groove section 45 includes a center section 46, a swirl-like section 47, and a material introducing section 48.

The center section 46 is a circular hollow formed around the center axis AX of the flat screw 40. The center section 46 is opposed to the communication hole 56 provided in the barrel 50.

The swirl-like section 47 is a groove extending in a swirl shape to draw an arc toward the outer circumference of the groove forming surface 42 centering on the center section 46. The swirl-like section 47 may be configured to extend in an involute curve shape or a spiral shape. One end of the swirl-like section 47 is coupled to the center section 46. The other end of the swirl-like section 47 is coupled to the material introducing section 48.

The material introducing section 48 is a groove wider than the swirl-like section 47 provided at the outer circumferential edge of the screw counter surface 52. The material introducing section 48 continues to a side surface 43 of the flat screw 40. The material introducing section 48 introduces a material supplied from the material storage section 20 via the supply path 22 into the swirl-like section 47.

Figure 5:
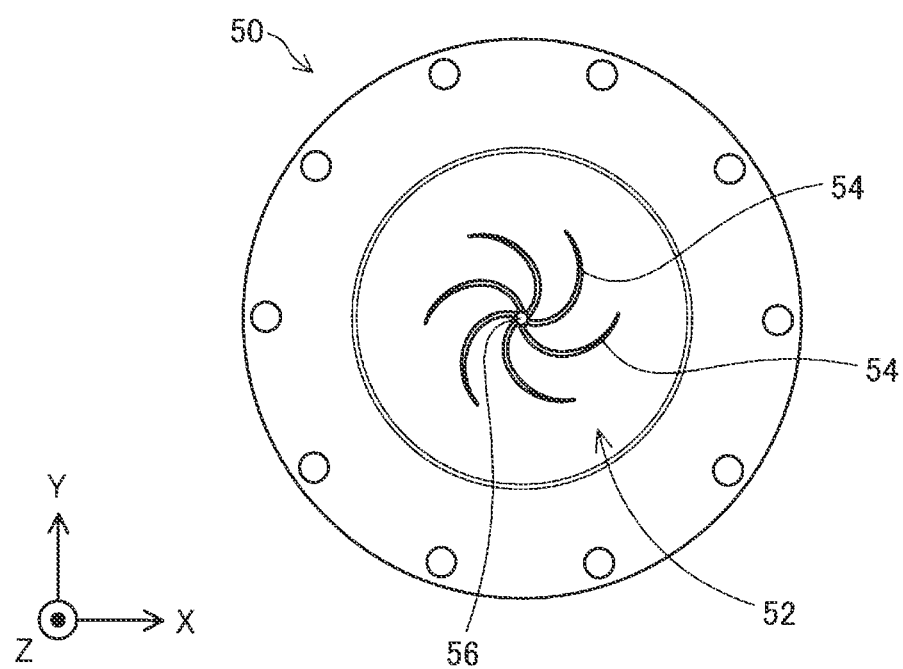
FIG. 5 is a top view showing the configuration of a screw counter surface of a barrel in the first embodiment.

FIG. 5 is a top view showing the configuration of the screw counter surface 52 of the barrel 50 in this embodiment. As explained above, the communication hole 56 communicating with the nozzle 65 is formed in the center of the screw counter surface 52. A plurality of guide grooves 54 are formed around the communication hole 56 on the screw counter surface 52. One ends of the guide grooves 54 are coupled to the communication hole 56. The guide grooves 54 extend in a swirl shape from the communication hole 56 toward the outer circumference of the screw counter surface 52. The guide grooves 54 have a function of guiding the shaping material to the communication hole 56.

With the configuration of the three-dimensional shaping apparatus 100 explained above, the material supplied from the material supplying mechanism 500 and stored in the material storage section 20 is supplied from the side surface 43 of the rotating flat screw 40 to the material introducing section 48 through the supply path 22. The material supplied to the material introducing section 48 is conveyed into the swirl-like section 47 by the rotation of the flat screw 40.

At least a part of the material conveyed into the swirl-like section 47 is melted by the rotation of the flat screw 40 and the heating by the heater 58 incorporated in the barrel 50 to be a paste-like shaping material having fluidity.

The shaping material is conveyed toward the center section 46 in the swirl-like section 47 by the rotation of the flat screw 40. The shaping material conveyed to the center section 46 is delivered from the communication hole 56 to the nozzle 65 via the first channel 61 and ejected from the nozzle 65 toward the shaping table 300. In this way, the shaping material is stacked on the shaping table 300 to shape a three-dimensional shaped object.

Figure 6:
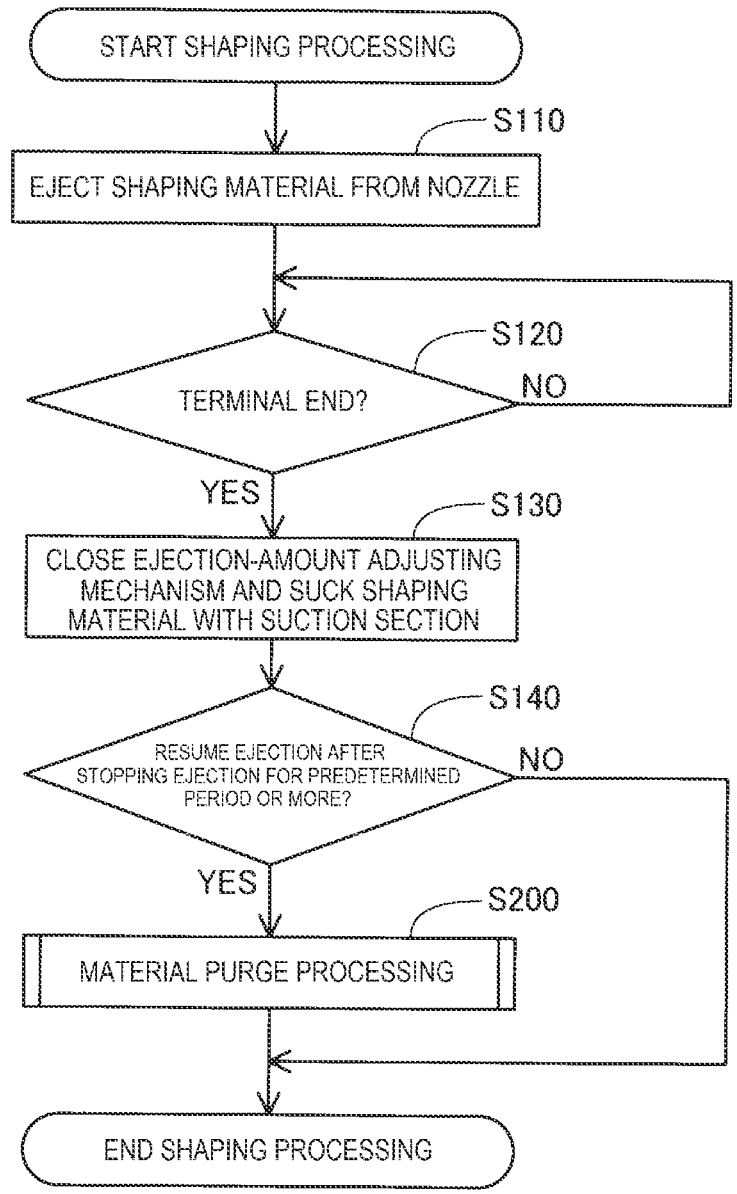
FIG. 6 is a flowchart showing content of shaping processing in the first embodiment.

FIG. 6 is a flowchart showing content of shaping processing for realizing shaping of a three-dimensional shaped object. This processing is executed when a user performs predetermined start operation on an operation panel provided in the three-dimensional shaping apparatus 100 or a computer coupled to the three-dimensional shaping apparatus 100.

First, in step S110, the control section 700 controls the melting section 30, the ejection-amount adjusting mechanism 70, the first moving mechanism 410, and the second moving mechanism 420 to thereby eject the shaping material from the nozzle 65 and shape the three-dimensional shaped object in a shaping region of the shaping table 300. The shaping region is a region where the three-dimensional shaped object is shaped. The shaping region is set by shaping path data included in a G code for performing shaping of the three-dimensional shaped object.

Subsequently, in step S120, the control section 700 determines whether the shaping is at a terminal end of a continuous shaping path. The control section 700 can determine, using the shaping path data included in the G code for performing the shaping of the three-dimensional shaped object, whether the shaping is at the terminal end of the continuous shaping path. When not determining in step S120 that the shaping is at the terminal end of the continuous shaping path, the control section 700 continues the shaping of the three-dimensional shaped object while repeating the processing in step S120.

On the other hand, when determining in step S120 that the shaping is at the terminal end of the continuous shaping path, in step S130, the control section 700 controls the ejection-amount adjusting mechanism 70 to thereby set the melting section 30 and the nozzle 65 in the non-communication state. Further, the control section 700 controls the suction section 80 to thereby suck the shaping material remaining between the first channel 61 and the nozzle 65. Timing when the ejection of the shaping material from the nozzle 65 is stopped is delayed from timing when the melting section 30 and the nozzle 65 are set in the non-communication state by the ejection-amount adjusting mechanism 70. Therefore, the control section 700 controls the ejection-amount adjusting mechanism 70 and the suction section 80 to prevent excess and shortage of the shaping material at the terminal end of the continuous shaping path.

After stopping the ejection of the shaping material from the nozzle 65 by controlling the ejection-amount adjusting mechanism 70, in step S140, the control section 700 determines whether to resume the ejection of the shaping material from the nozzle 65 after stopping the ejection of the shaping material for a predetermined period or more. The stopping the ejection of the shaping material from the nozzle 65 does not include stopping the ejection of the shaping material from the nozzle 65 by turning off a power supply of the three-dimensional shaping apparatus 100.

The predetermined period can be set according to speed of progress of denaturation of the shaping material. For example, the period can be set by checking, with a test performed in advance, a period until quality deterioration of the three-dimensional shaped object is caused by the denaturation of the shaping material after the ejection of the shaping material from the nozzle 65 is stopped. When thermoplastic resin is included in the material, the period may be set according to a glass transition point of the thermoplastic resin. In this case, the period is set shorter as the glass transition point of the thermoplastic resin is lower. That is, when a glass transition point of second thermoplastic resin is lower than a glass transition point of first thermoplastic resin, the period in which the second thermoplastic resin is included in the material is set shorter than the period in which the first thermoplastic resin is included in the material. In this embodiment, since ABS resin, which is the thermoplastic resin, is used as the material, a period corresponding to a glass transition point of the ABS resin is set as the period. The period can be set according to a type of the material. When a plurality of kinds of thermoplastic resin are included in the material, the period may be set using a glass transition point of thermoplastic resin having the largest physical quantity among the plurality of kinds of thermoplastic resin. The period is sometimes referred to as standby period.

When the ejection of the shaping material from the nozzle 65 is stopped, for example, the ejection of the shaping material from the nozzle 65 is sometimes temporarily stopped in order to receive the supply of the material from the material supplying mechanism 500. In this case, a period in which the ejection of the shaping material from the nozzle 65 is stopped can be calculated by adding up a time necessary for the ejection unit 200 to move to below the material supplying mechanism 500 and a time necessary for the ejection unit 200 to receive the supply of the material from the material supplying mechanism 500. The time necessary for the movement of the ejection unit 200 can be calculated using the present position of the ejection unit 200, the position of the material supplying mechanism 500, a position where shaping is performed by the ejection unit 200 next, and the moving speed of the ejection unit 200. The time necessary for the ejection unit 200 to receive the supply of the material from the material supplying mechanism 500 can be stored in advance in the control section 700.

When not determining in step S140 to resume the ejection of the shaping material from the nozzle 65 after stopping the ejection of the shaping material for the predetermined period or more, the control section 700 ends the shaping processing in this shaping path and resumes the shaping processing from step S110 in order to perform shaping in the next shaping path.

On the other hand, when determining in step S140 to resume the ejection of the shaping material from the nozzle 65 after stopping the ejection of the shaping material for the predetermined period or more, in step S200, the control section 700 ends the shaping processing in this shaping path after executing the material purge processing and resumes the shaping processing from step S110 in order to perform shaping in the next shaping path. The control section 700 repeats this processing until the shaping of the three-dimensional shaped object is completed.

Figure 7:
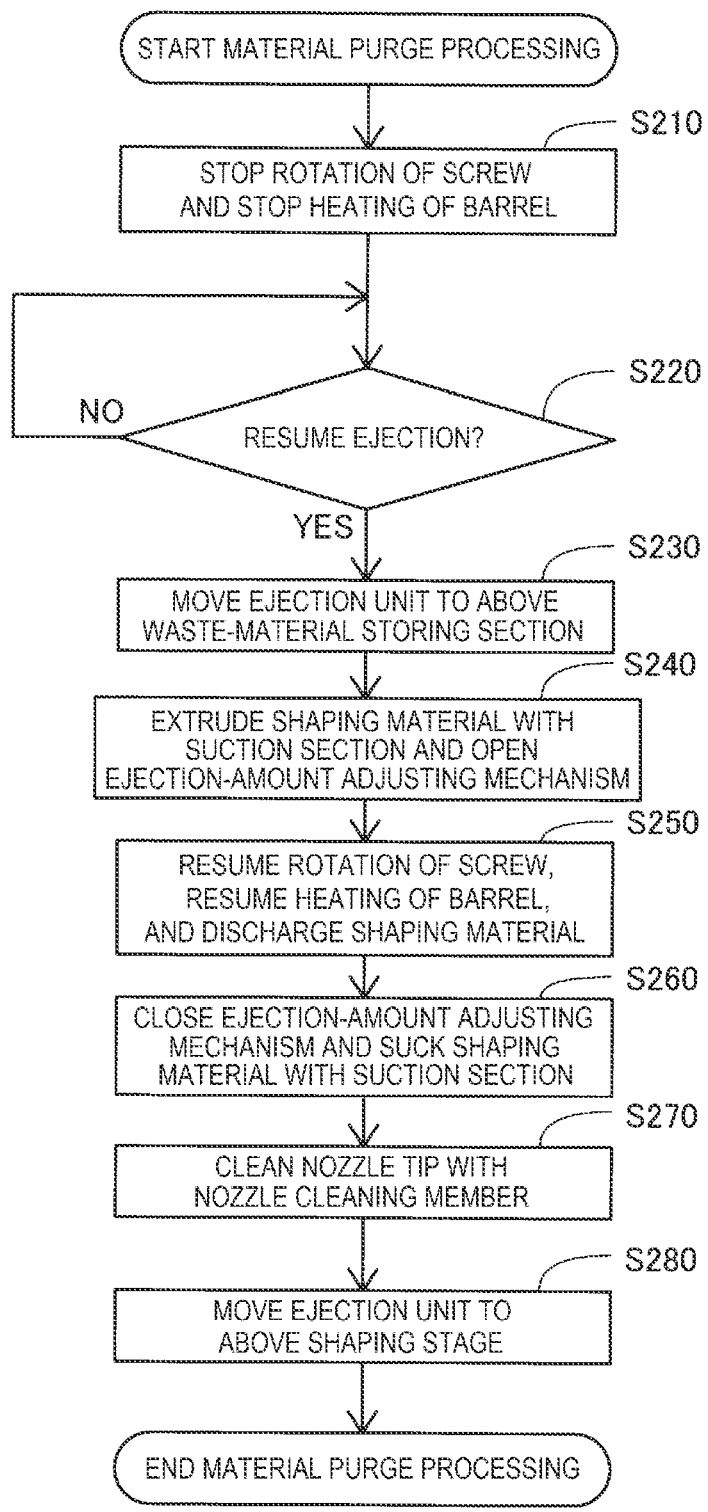
FIG. 7 is a flowchart showing content of material purge processing in the first embodiment.

FIG. 7 is a flowchart showing content of material purge processing in this embodiment. This processing is executed by the control section 700 in a period in which the three-dimensional shaped object is shaped. The period in which the three-dimensional shaped object is shaped means a period until the shaping of the three-dimensional shaped object is completed and the shaping processing is ended by the control section 700 after the shaping processing for realizing the shaping of the three-dimensional shaped object is started by the control section 700. When the material purge processing is started, first, in step S210, the control section 700 controls the driving motor 32 to thereby stop the rotation of the flat screw 40. Further, the control section 700 controls the heater 58 of the barrel 50 to thereby stop the heating of the barrel 50.

Subsequently, in step S220, the control section 700 determines whether to resume the ejection of the shaping material from the nozzle 65. The control section 700 can determine, for example, using an open/close flag of the ejection-amount adjusting mechanism 70 included in the G code for performing the shaping of the three-dimensional shaped object, whether to resume the ejection of the shaping material from the nozzle 65.

When not determining in step S220 to resume the ejection of the shaping material from the nozzle 65, the control section 700 repeats the processing in step S220 until determining to resume the ejection of the shaping material from the nozzle 65.

On the other hand, when determining in step S220 to resume the ejection of the shaping material from the nozzle 65, in step S230, the control section 700 controls the first moving mechanism 410 to thereby move the ejection unit 200 to above the waste-material storing section 600.

In step S240, the control section 700 controls the suction section 80 to thereby extrude the shaping material remaining in the cylinder 81 of the suction section 80 to the first channel 61. Further, the control section 700 controls the ejection-amount adjusting mechanism 70 to thereby set the melting section 30 and the nozzle 65 in the communication state.

In step S250, the control section 700 controls the driving motor 32 to thereby resume the rotation of the flat screw 40. Further, the control section 700 controls the heater 58 of the barrel 50 to thereby resume the heating of the barrel 50 and discharges the shaping material remaining between the melting section 30 and the nozzle 65 from the nozzle 65 toward the waste-material storing section 600. That is, in this embodiment, the control section 700 discharges the shaping material remaining between the melting section 30 and the nozzle 65 toward the waste-material storing section 600, which is a region different from the shaping region. Since the melting section 30 and the nozzle 65 are set in the communication state, a new shaping material is supplied from the melting section 30 to the nozzle 65 by the rotation of the flat screw 40. An old shaping material is extruded from the nozzle 65 by the supplied new shaping material and discharged to the waste-material storing section 600. Therefore, the old shaping material remaining between the melting section 30 and the nozzle 65 is replaced with the new shaping material. At this time, the control section 700 desirably discharges, from the nozzle 65, the shaping material equal to or more than a capacity between the melting section 30 and the nozzle 65 such that the old shaping material remaining between the melting section 30 and the nozzle 65 is surely replaced with the new shaping material. The shaping material discharged from the nozzle 65 is stored in the waste-material storing section 600.

In step S260, the control section 700 controls the ejection-amount adjusting mechanism 70 to thereby set the melting section 30 and the nozzle 65 in the non-communication state. Further, the control section 700 controls the suction section 80 to thereby suck the shaping material remaining between the first channel 61 and the nozzle 65 into the cylinder 81 of the suction section 80. Therefore, the shaping material is suppressed from leaking from the nozzle 65 while the ejection unit 200 moves from above the waste-material storing section 600 to above the shaping table 300.

In step S270, the control section 700 controls the first moving mechanism 410 to thereby rub the tip portion of the nozzle 65 against the nozzle cleaning member 610 and remove the shaping material adhering to the tip portion of the nozzle 65. In step S280, the control section 700 controls the first moving mechanism 410 to thereby move the ejection unit 200 to above the shaping table 300. Thereafter, the control section 700 ends this processing and resumes the shaping processing.

With the three-dimensional shaping apparatus 100 in this embodiment explained above, when the ejection of the shaping material from the nozzle 65 is resumed after being stopped for a long period, prior to the resumption of the ejection of the shaping material to the shaping region, the control section 700 discharges the old shaping material remaining between the melting section 30 and the nozzle 65. Therefore, it is possible to suppress deterioration in the quality of the three-dimensional shaped object by a denatured old shaping material.

In this embodiment, the control section 700 discharges the old shaping material remaining between the melting section 30 and the nozzle 65 earlier as a glass transition point of thermoplastic resin included in the material is lower. That is, the control section 700 discharges the old shaping material remaining between the melting section 30 and the nozzle 65 earlier as heat resistance of the shaping material is lower. Therefore, it is possible to more surely suppress deterioration in the quality of the three-dimensional shaped object.

In this embodiment, when the ejection of the shaping material from the nozzle 65 is stopped for a long period, the control section 700 stops the rotation of the flat screw 40. Therefore, it is possible to suppress denaturation of the shaping material.

In this embodiment, when the ejection of the shaping material from the nozzle 65 is stopped for a long period, the control section 700 stops the heating of the barrel 50 by the heater 58. Therefore, it is possible to suppress denaturation of the shaping material.

In this embodiment, the shaping material adhering to the tip portion of the nozzle 65 can be removed by the nozzle cleaning member 610. Therefore, it is possible to further suppress occurrence of clogging of the nozzle 65 and deterioration in the quality of the three-dimensional shaped object.

In this embodiment, the material of the pellet-like ABS resin is used. However, as the material used in the ejection unit 200, for example, a material for shaping a three-dimensional shaped object using, as a main material, various materials such as a material having thermoplasticity, a metal material, and a ceramic material can be adopted. The "main material" means a material functioning as a central material forming the shape of the three-dimensional shaped object and means a material having a content equal to or larger than 50 weight % in the three-dimensional shaped object. The shaping material explained above includes a shaping material obtained by melting the main material alone and a shaping material obtained by melting a part of components contained together with the main material and forming the part of the components in a paste state.

When the material having thermoplasticity is used as the main material, the shaping material is generated by plasticizing the material in the melting section 30. "Plasticizing" means that heat is applied to the material having thermoplasticity and the material melts.

As the material having thermoplasticity, for example, one of the following materials or a thermoplastic resin material obtained by combining two or more of the following materials can be used.

Examples of the Thermoplastic Resin Material

General-purpose engineering plastic such as polypropylene resin (PP), polyethylene resin (PE), polyacetal resin (POM), polyvinylchloride resin (PVC), polyamide resin (PA), acrylonitrile butadiene styrene resin (ABS), polylactic resin (PLA), polyphenylene sulfide resin (PPS), polyether ether ketone (PEEK), polycarbonate (PC), denaturated-polyphenyleneether, polybutylene terephthalate, and polyethylene terephthalate and engineering plastic such as polysulphone, polyether sulphone, polyphenylene sulfide, polyarylate, polyimide, polyamide-imide, polyether imide, and polyether ether ketone A pigment, metal, ceramic, and an additive such as wax, a flame retardant, an antioxidant, or a heat stabilizer may be mixed in the material having thermoplasticity. The material having thermoplasticity is converted into a state in which the material is plasticized and melted by the rotation of the flat screw 40 and the heating by the heater 58 in the melting section 30. The shaping material generated in that way is ejected from the nozzle hole 67 and thereafter hardened by a drop of temperature.

The material having thermoplasticity is desirably ejected from the nozzle hole 67 in a state in which the material is heated to temperature equal to or higher than a glass transition point of the material and is completely melted. For example, the ABS resin has a glass transition point of approximately 120° C. and desirably has approximately 200° C. during the ejection from the nozzle hole 67. In order to eject the shaping material in a high-temperature state in this way, a heater may be provided around the nozzle hole 67.

In the ejection unit 200, for example, any of the following metal materials may be used as the main material instead of the material having thermoplasticity. In this case, it is desirable that components to be melted in generation of the shaping material are mixed in a powder material obtained by powdering the metal material and the powder material is put in the melting section 30.

Examples of the Metal Materials

Single metal such as magnesium (Mg), iron (Fe), cobalt (Co), chrome (Cr), aluminum (Al), titanium (Ti), copper (Cu), and nickel (Ni) or alloys containing one or more of these kinds of metal Examples of the Alloys Maraging steel, stainless steel, cobalt chrome molybdenum, a titanium alloy, a nickel alloy, an aluminum alloy, a cobalt alloy, and a cobalt chrome alloy In the ejection unit 200, a ceramic material can be used as the main material instead of the metal material. As the ceramic material, for example, oxide ceramics such as silicon dioxide, titanium dioxide, aluminum oxide, and zirconium oxide and non-oxide ceramics such as aluminum nitride can be used. When the metal material or the ceramic material described above is used as the main material, the shaping material disposed on the shaping table 300 may be hardened by sintering by, for example, irradiation of a laser or warm wind.

The powder material of the metal material or the ceramic material put in the material storage section 20 may be a mixed material obtained by mixing a plurality of kinds of powder of single metal, powder of alloys, or powder of ceramic materials. The powder material of the metal material or the ceramic material may be coated by, for example, the thermoplastic resin illustrated above or other kinds of thermoplastic resin. In this case, in the melting section 30, the thermoplastic resin may be melted to develop fluidity.

For example, the following solvents can be added to the powder material of the metal material or the ceramic material put in the material storage section 20. As the solvents, one kind selected out of the following can be used or two or more kinds selected out of the following can be used in combination.

Examples of the Solvents

Water; (poly) alkylene glycol monoalkyl ethers such as ethylene glycol monomethyl ether, ethylene glycol monoethyl ether, propylene glycol monomethyl ether, and propylene glycol monoethyl ether; acetic ethers such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetyl acetone; alcohols such as ethanol, propanol, and butanol; tetraalkyl ammonium acetates; sulfoxide-based solvents such as dimethyl sulfoxide and diester sulfoxide; pyridine-based solvents such as pyridine, γ-picoline, and 2,6-lutidine; tetraalkyl ammonium acetate (for example, tetrabutyl ammonium acetate); and ion liquid such as butyl carbitol acetate Besides, for example, the following binders can be added to the powder material of the metal material or the ceramic material put in the material storage section 20.

Examples of the Binders

Figure 8:
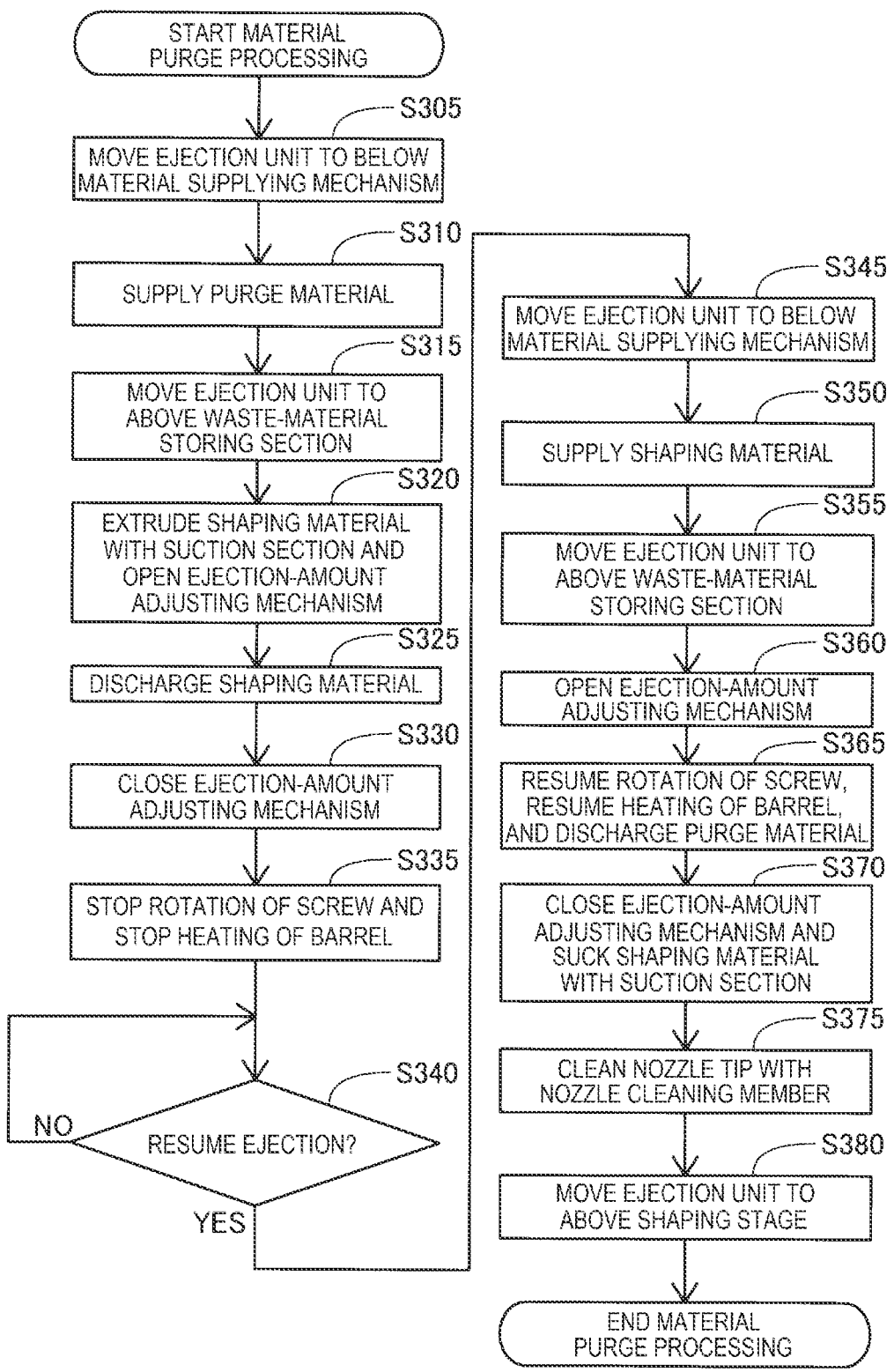
FIG. 8 is a flowchart showing content of material purge processing in a second embodiment.

Acrylic resin, epoxy resin, silicone resin, cellulose-based resin, or other kinds of synthetic resin or PLA (polylactic acid), PA (polyamide), PPS (polyphenylene sulfide), PEEK (polyether ether ketone), or other kinds of thermoplastic resin B. Second Embodiment FIG. 8 is a flowchart showing content of material purge processing in a second embodiment. In the three-dimensional shaping apparatus 100 in the second embodiment, the content of the material purge processing is different from the content of the material purge processing in the first embodiment. The other components are the same as the components in the first embodiment shown in FIG. 1 unless specifically explained otherwise.

In this embodiment, when the material purge processing is started, first, in step S305, the control section 700 controls the first moving mechanism 410 to thereby move the ejection unit 200 to below the material supplying mechanism 500.

Subsequently, in step S310, the control section 700 controls the material supplying mechanism 500 to thereby supply, from the supply port 520 of the storage section 510 storing a purge material, the purge material to the material storage section 20 of the ejection unit 200.

After the supply of the purge material to the ejection unit 200 ends, in step S315, the control section 700 controls the first moving mechanism 410 to thereby move the ejection unit 200 to above the waste-material storing section 600.

In step S320, the control section 700 controls the suction section 80 to thereby extrude a shaping material remaining in the cylinder 81 of the suction section 80 to the first channel 61. Further, the control section 700 controls the ejection-amount adjusting mechanism 70 to thereby set the melting section 30 and the nozzle 65 in the communication state.

In step S325, the control section 700 supplies the purge material to the nozzle 65 according to the rotation of the flat screw 40 and discharges the shaping material remaining between the melting section 30 and the nozzle 65 from the nozzle 65. That is, the control section 700 replaces the shaping material remaining between the melting section 30 and the nozzle 65 with the purge material according to the rotation of the flat screw 40. The shaping material and the purge material discharged from the nozzle 65 are stored in the waste-material storing section 600.

After replacing the remaining shaping material with the purge material, in step S330, the control section 700 controls the ejection-amount adjusting mechanism 70 to thereby set the melting section 30 and the nozzle 65 in the non-communication state. Therefore, the discharge of the shaping material and the purge material from the nozzle 65 is stopped. Timing when the control section 700 controls the ejection-amount adjusting mechanism 70 to thereby set the melting section 30 and the nozzle 65 in the non-communication state may be after step S335 and before step S345.

In step S335, the control section 700 controls the driving motor 32 to thereby stop the rotation of the flat screw 40. Further, the control section 700 controls the heater 58 of the barrel 50 to thereby stop the heating of the barrel 50.

In step S340, the control section 700 determines whether to resume the ejection of the shaping material from the nozzle 65. When not determining in step S340 to resume the ejection of the shaping material from the nozzle 65, the control section 700 repeats the processing in step S340 until determining to resume the ejection of the shaping material from the nozzle 65.

On the other hand, when determining in step S340 to resume the ejection of the shaping material from the nozzle 65, in step S345, the control section 700 controls the first moving mechanism 410 to thereby move the ejection unit 200 to below the material supplying mechanism 500.

In step S350, the control section 700 controls the material supplying mechanism 500 to thereby supply, from the supply port 520 of the storage section 510 storing the material forming the shaping material, the material forming the shaping material to the material storage section 20 of the ejection unit 200.

In step S355, the control section 700 controls the first moving mechanism 410 to thereby move the ejection unit 200 to above the waste-material storing section 600.

In step S360, the control section 700 controls the ejection-amount adjusting mechanism 70 to thereby set the melting section 30 and the nozzle 65 in the communication state.

In step S365, the control section 700 controls the driving motor 32 to thereby resume the rotation of the flat screw 40 and controls the heater 58 of the barrel 50 to thereby resume the heating of the barrel 50 to supply the shaping material to the nozzle 65 and discharges the purge material remaining between the melting section 30 and the nozzle 65 from the nozzle 65. That is, the control section 700 replaces the purge material remaining between the melting section 30 and the nozzle 65 with the shaping material according to the rotation of the flat screw 40. The shaping material and the purge material discharged from the nozzle 65 are stored in the waste-material storing section 600.

In step S370, the control section 700 controls the ejection-amount adjusting mechanism 70 to thereby set the melting section 30 and the nozzle 65 in the non-communication state. Further, the control section 700 controls the suction section 80 to thereby suck the shaping material remaining between the first channel 61 and the nozzle 65. Therefore, the shaping material is suppressed from leaking from the nozzle 65 while the ejection unit 200 moves from above the waste-material storing section 600 to above the shaping table 300.

In step S375, the control section 700 controls the first moving mechanism 410 to thereby rub the tip portion of the nozzle 65 against the nozzle cleaning member 610 and remove the shaping material adhering to the tip portion of the nozzle 65. In step S380, the control section 700 controls the first moving mechanism 410 to thereby move the ejection unit 200 to above the shaping table 300. Thereafter, the control section 700 ends this processing and resumes the shaping processing.

With the three-dimensional shaping apparatus 100 in this embodiment explained above, when stopping the ejection of the shaping material from the nozzle 65 for a long period, the control section 700 replaces the shaping material remaining between the melting section 30 and the nozzle 65 with the purge material. Thereafter, when resuming the ejection of the shaping material from the nozzle 65, the control section 700 replaces the purge material remaining between the melting section 30 and the nozzle 65 with a new shaping material. Therefore, the shaping material is suppressed from remaining between the melting section 30 and the nozzle 65. The melting section 30 to the nozzle 65 can be cleaned by the purge material. Therefore, it is possible to further suppress deterioration in the quality of the three-dimensional shaped object.

C. Third Embodiment

Figure 9:
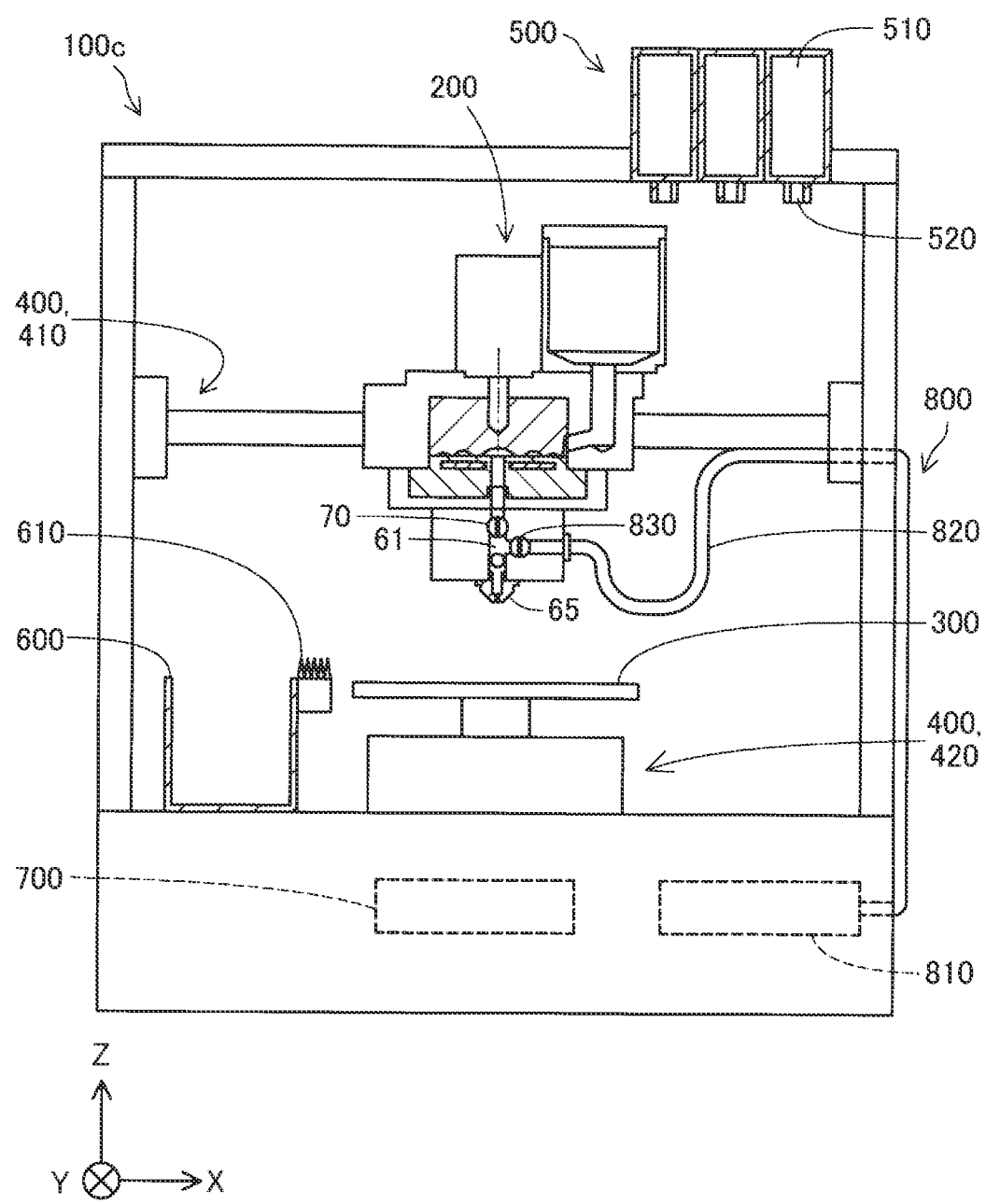
FIG. 9 is an explanatory diagram showing a schematic configuration of a three-dimensional shaping apparatus in a third embodiment.

FIG. 9 is an explanatory diagram showing a schematic configuration of a three-dimensional shaping apparatus 100*c* in a third embodiment. The three-dimensional shaping apparatus 100*c* in the third embodiment is different from the three-dimensional shaping apparatus 100 in the first embodiment in that the three-dimensional shaping apparatus 100*c* includes an air supplying mechanism 800. In the three-dimensional shaping apparatus 100*c* in the third embodiment, content of material purge processing is different from the content of the material purge processing in the first embodiment. The other components are the same as the components in the first embodiment shown in FIG. 1 unless specifically explained otherwise.

The air supplying mechanism 800 includes a compressor 810, an air supply channel 820, and an on-off valve 830. The compressor 810 compresses air into compressed air. The air supply channel 820 couples the compressor 810 and the ejection-amount adjusting mechanism 70 and the suction section 80 in the first channel 61. The on-off valve 830 is provided near a coupling section to the first channel 61 in the air supply channel 820. The on-off valve 830 is opened and closed by a motor driven under the control by the control section 700 and switches a communication state and a non-communication state of the compressor 810 and the first channel 61.

Figure 10:
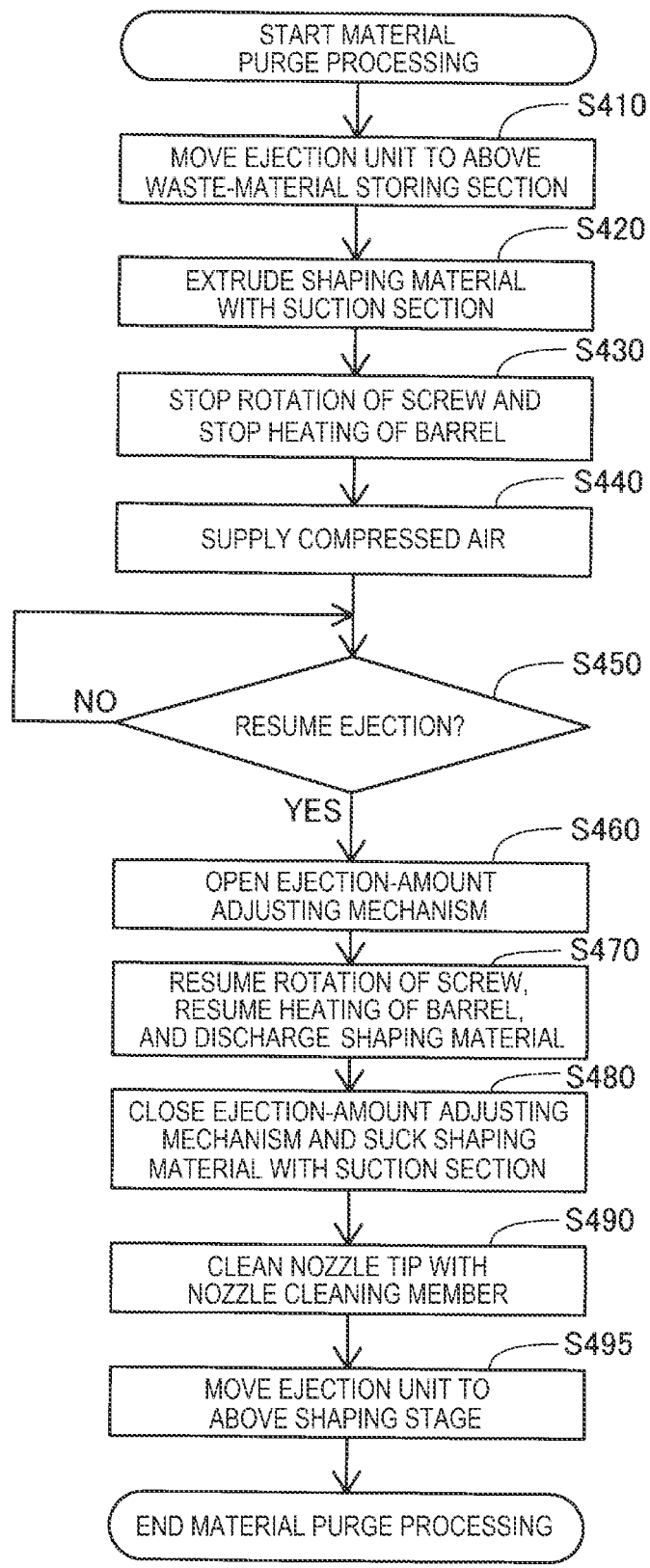
FIG. 10 is a flowchart showing content of material purge processing in the third embodiment.

FIG. 10 is a flowchart showing the content of the material purge processing in the third embodiment. When the material purge processing is started, first, in step S410, the control section 700 controls the first moving mechanism 410 to thereby move the ejection unit 200 to above the waste-material storing section 600.

Subsequently, in step S420, the control section 700 controls the suction section 80 to thereby extrude the shaping material remaining in the cylinder 81 of the suction section 80 to the first channel 61.

In step S430, the control section 700 controls the driving motor 32 to thereby stop the rotation of the flat screw 40.

In step S440, the control section 700 controls the compressor 810 and the on-off valve 830 to jet compressed air into the first channel 61 via the air supply channel 820 to thereby discharge the shaping material remaining between the first channel 61 and the nozzle 65 from the nozzle 65. In step S420, since the plunger 82 of the suction section 80 moves to the first channel 61 side, the compressed air is suppressed from escaping into the cylinder 81. The on-off valve 830 is opened before the jetting of the compressed air and closed after the jetting of the compressed air.

In step S450, the control section 700 determines whether to resume the ejection of the shaping material from the nozzle 65. When not determining in step S450 to resume the ejection of the shaping material from the nozzle 65, the control section 700 repeats the processing in step S450 until determining to resume the ejection of the shaping material from the nozzle 65.

On the other hand, when determining in step S450 to resume the ejection of the shaping material from the nozzle 65, in step S460, the control section 700 controls the ejection-amount adjusting mechanism 70 to thereby set the melting section 30 and the nozzle 65 in the communication state.

In step S470, the control section 700 supplies the shaping material to the nozzle 65 according to the rotation of the flat screw 40 and discharges the shaping material remaining in the melting section 30 from the nozzle 65. The shaping material discharged from the nozzle 65 is stored in the waste-material storing section 600.

In step S480, the control section 700 controls the ejection-amount adjusting mechanism 70 to thereby set the melting section 30 and the nozzle 65 in the non-communication state. Further, the control section 700 controls the suction section 80 to thereby suck the shaping material remaining between the first channel 61 and the nozzle 65. Therefore, the shaping material is suppressed from leaking from the nozzle 65 while the ejection unit 200 moves from above the waste-material storing section 600 to above the shaping table 300.

In step S490, the control section 700 controls the first moving mechanism 410 to thereby rub the tip portion of the nozzle 65 against the nozzle cleaning member 610 and remove the shaping material adhering to the tip portion of the nozzle 65. In step S495, the control section 700 controls the first moving mechanism 410 to thereby move the ejection unit 200 to above the shaping table 300. Thereafter, the control section 700 ends this processing and resumes the shaping processing.

With the three-dimensional shaping apparatus 100c in this embodiment explained above, when stopping the ejection of the shaping material from the nozzle 65 for a long period, the control section 700 discharges, with the compressed air, the shaping material remaining between the first channel 61 and the nozzle 65 from the nozzle 65. Thereafter, when resuming the ejection of the shaping material from the nozzle 65, the control section 700 replaces the old shaping material remaining in the melting section 30 with the new shaping material. Therefore, it is possible to further suppress deterioration in the quality of the three-dimensional shaped object. In particular, in this embodiment, the shaping material remaining in the nozzle 65 in which denaturation easily progresses according to the heating by the nozzle heater 91 can be discharged by the compressed air before the denaturation progresses. Therefore, it is possible to effectively suppress occurrence of clogging of the nozzle 65 and deterioration in the quality of the three-dimensional shaped object.

D. Fourth Embodiment

Figure 11:
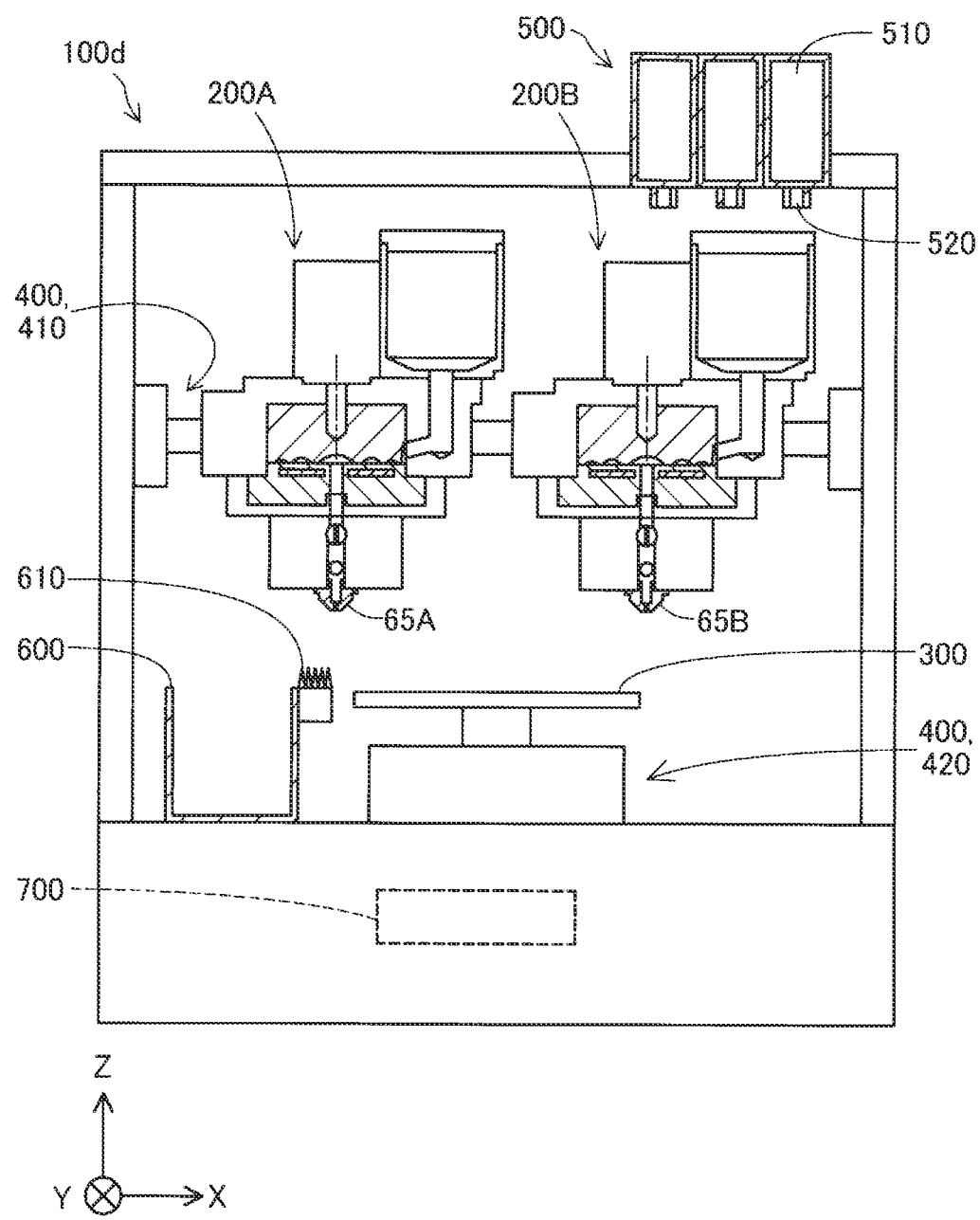
FIG. 11 is an explanatory diagram showing a schematic configuration of a three-dimensional shaping apparatus in a fourth embodiment.

FIG. 11 is an explanatory diagram showing a schematic configuration of a three-dimensional shaping apparatus 100d in a fourth embodiment. The three-dimensional shaping apparatus 100d in the fourth embodiment is different from the three-dimensional shaping apparatus 100 in the first embodiment in that the three-dimensional shaping apparatus 100d includes a first ejection unit 200A and a second ejection unit 200B. The other components are the same as the components in the first embodiment shown in FIG. 1 unless particularly explained otherwise.

The configuration of the first ejection unit 200A is the same as the configuration of the second ejection unit 200B. The configuration of the first ejection unit 200A and the configuration of the second ejection unit 200B are the same as the configuration of the ejection unit 200 in the first embodiment shown in FIG. 2. In the following explanation, "A" is added to the ends of signs of components related to the first ejection unit 200A and "B" is added to the ends of signs of components related to the second ejection unit 200B. A nozzle 65A included in the first ejection unit 200A is referred to as first nozzle 65A. A nozzle 65B included in the second ejection unit 200B is referred to as second nozzle 65B.

In this embodiment, the first moving mechanism 410 is configured to be capable of moving the first ejection unit 200A and the second ejection unit 200B independently from each other. In this embodiment, the shaping material is supplied to the first ejection unit 200A from the material supplying mechanism 500. The support material is supplied to the second ejection unit 200B from the material supplying mechanism 500. The control section 700 ejects the shaping material from the first nozzle 65A of the first ejection unit 200A to the shaping region of the shaping table 300 and ejects the support material from the second nozzle 65B of the second ejection unit 200B to the shaping region of the shaping table 300 to thereby shape a three-dimensional shaped object.

In this embodiment, the ejection of the shaping material from the first nozzle 65A of the first ejection unit 200A is stopped while the support material is ejected from the second nozzle 65B of the second ejection unit 200B. When determining to resume the ejection of the shaping material from the first nozzle 65A after stopping the ejection of the shaping material for a predetermined period or more, as in the first embodiment, the control section 700 executes material purge processing on the first ejection unit 200A. On the other hand, the ejection of the support material from the second nozzle 65B of the second ejection unit 200B is stopped while the shaping material is ejected from the first nozzle 65A of the first ejection unit 200A. When determining to resume the ejection of the support material from the second nozzle 65B after stopping the ejection of the support material for a predetermined period or more, as in the first embodiment, the control section 700 executes the material purge processing on the second ejection unit 200B.

With the three-dimensional shaping apparatus 100d in this embodiment explained above, when the ejection of the shaping material from the first nozzle 65A of the first ejection unit 200A is resumed after being stopped for a long period according to the ejection of the support material from the second nozzle 65B of the second ejection unit 200B, prior to the resumption of the ejection of the shaping material to the shaping region, the control section 700 discharges an old shaping material remaining between a melting section 30A and the first nozzle 65A. When the ejection of the support material from the second nozzle 65B of the second ejection unit 200B is resumed after being stopped for a long period according to the ejection of the shaping material from the first nozzle 65A of the first ejection unit 200A, prior to the resumption of the ejection of the support material to the shaping region, the control section 700 discharges an old support material remaining between a melting section 30B and the second nozzle 65B. Therefore, it is possible to suppress deterioration in the quality of a three-dimensional shaped object by the denatured old shaping material or old support material.

In the three-dimensional shaping apparatus 100d, the control section 700 may execute the same material purge processing as the material purge processing in the second embodiment. The three-dimensional shaping apparatus 100d may further include the air supplying mechanism 800. The control section 700 may execute the same material purge processing as the material purge processing in the third embodiment.

E. Other Embodiments (E1) In the three-dimensional shaping apparatuses 100, 100c, and 100d in the embodiments explained above, in the material purge processing, the control section 700 stops the rotation of the flat screw 40 and stops the heating by the heater 58 of the barrel 50. However, in the material purge processing, the control section 700 may not stop the rotation of the flat screw 40 or the heating by the heater 58 of the barrel 50. In the material purge processing, the control section 700 may not stop the rotation of the flat screw 40 and may not stop the heating by the heater 58 of the barrel 50.

(E2) In the three-dimensional shaping apparatuses 100, 100c, and 100d in the embodiments explained above, the control section 700 stops the rotation of the flat screw 40 and stops the heating by the heater 58 of the barrel 50 before discharging the shaping material from the nozzle 65. However, the control section 700 may stop the rotation of the flat screw 40 or the heating by the heater 58 of the barrel 50 after discharging the shaping material from the nozzle 65. The control section 700 may stop the rotation of the flat screw 40 and stop the heating by the heater 58 of the barrel 50 after discharging the shaping material from the nozzle 65. In this case, it is possible to suppress denaturation of the shaping material between the stop and the resumption of the ejection of the shaping material from the nozzle 65 after the shaping material is discharged from the nozzle 65.

(E3) In the three-dimensional shaping apparatuses 100, 100c, and 100d in the embodiments explained above, the control section 700 discharges the shaping material from the nozzle 65, stops the rotation of the flat screw 40, and stops the heating by the heater 58 of the barrel 50 in the period from the stop to the resumption of the ejection of the shaping material from the nozzle 65. However, the control section 700 may not discharge the shaping material from the nozzle 65 in the period from the stop to the resumption of the ejection of the shaping material from the nozzle 65. The control section 700 may only stop the rotation of the flat screw 40 or may only stop the heating by the heater 58 of the barrel 50 without discharging the shaping material from the nozzle 65 in the period from the stop to the resumption of the ejection of the shaping material from the nozzle 65. The control section 700 may stop the rotation of the flat screw 40 and stop the heating by the heater 58 of the barrel 50 without discharging the shaping material from the nozzle 65 in the period from the stop to the resumption of the ejection of the shaping material from the nozzle 65. Even in this case, denaturation of the remaining shaping material can be suppressed. Therefore, it is possible to suppress deterioration in the quality of the three-dimensional shaped object.

(E4) In the three-dimensional shaping apparatuses 100, 100c, and 100d in the embodiments explained above, the nozzle heater 91 is provided in the ejecting section 60. However, the nozzle heater 91 may not be provided in the ejecting section 60.

(E5) In the three-dimensional shaping apparatuses 100, 100c, and 100d in the embodiments explained above, the melting section 30 includes the flat screw 40. However, the melting section 30 may include an inline screw longer than the flat screw 40 in the Z direction instead of the flat screw 40. The melting section 30 may not include the flat screw 40 and the inline screw and may melt the material with heating by a heating section such as a heater.

(E6) In the three-dimensional shaping apparatuses 100, 100c, and 100d in the embodiments explained above, the moving mechanism 400 is configured by the first moving mechanism 410 that moves the ejection unit 200 in the two axial directions of the X direction and the Y direction and the second moving mechanism 420 that moves the shaping table 300 in the Z direction. However, the moving mechanism 400 may move the ejection unit 200 in three axial directions of the X direction, the Y direction, and the Z direction. The moving mechanism 400 may move the shaping table 300 and the waste-material storing section 600 in the three axial directions of the X direction, the Y direction, and the Z direction without moving the ejection unit 200. In this case, the moving mechanism 400 only has to be configured to be capable of moving the material supplying mechanism 500 and supplying the material to the ejection unit 200.

(E7) In the three-dimensional shaping apparatuses 100, 100c, and 100d in the embodiments explained above, the control section 700 discharges, in the material purge processing, the shaping material remaining between the melting section 30 and the nozzle 65 toward the waste-material storing section 600, which is the region different from the shaping region. However, the control section 700 may discharge, in the material purge processing, the shaping material remaining between the melting section 30 and the nozzle 65 toward a region on the shaping table 300 different from the shaping region.

(E8) In the three-dimensional shaping apparatuses 100, 100c, and 100d in the embodiments explained above, the control section 700 executes the material purge processing when determining to resume the ejection of the shaping material from the nozzle 65 after stopping the ejection of the shaping material for the predetermined period or more. However, the control section 700 may execute, without using the predetermined period, the material purge processing when determining that that denaturation of the shaping material progresses before resuming the ejection of the shaping material from the nozzle 65 after stopping the ejection of the shaping material. For example, the control section 700 may determine, according to a change in the number of revolutions of the driving motor 32 that rotates the flat screw 40, whether denaturation of the shaping material progresses. Besides, the control section 700 may detect a change in physical properties of the shaping material with various sensors to thereby determine whether denaturation of the shaping material progresses.

(E9) In the three-dimensional shaping apparatuses 100, 100c, and 100d in the embodiments explained above, the control section 700 may execute the material purge processing at timing when a predetermined period elapses after the ejection of the shaping material from the nozzle 65 is stopped. For example, the control section 700 may determine whether the predetermined time elapses after the ejection of the shaping material from the nozzle 65 is stopped and execute the material purge processing when determining that the predetermined time elapses after the ejection of the shaping material from the nozzle 65 is stopped.

(E10) The three-dimensional shaping apparatuses 100, 100c, and 100d in the embodiments explained above may not include the nozzle cleaning member 610.

F. Other forms

The present disclosure is not limited to the embodiments explained above and can be realized in various forms in a range not departing from the gist of the present disclosure. For example, the present disclosure can also be realized by the following forms. Technical features in the embodiments explained above corresponding to technical features in the forms described below can be substituted or combined as appropriate in order to solve a part or all of the problems of the present disclosure or achieve a part or all of the effects of the present disclosure. The technical features can be deleted as appropriate unless the technical features are explained as essential technical features in this specification.

(1) According to a first form of the present disclosure, a three-dimensional shaping apparatus is provided. The three-dimensional shaping apparatus includes: a melting section configured to melt a material into a shaping material; a first channel communicating with the melting section, the shaping material flowing through the first channel; a nozzle communicating with the first channel and configured to eject the shaping material; an ejection-amount adjusting mechanism provided in the first channel and configured to adjust an ejection amount of the shaping material from the nozzle; a shaping table on which the shaping material ejected from the nozzle is stacked; a moving mechanism configured to change relative positions of the nozzle and the shaping table; and a control section configured to control the melting section, the ejection-amount adjusting mechanism, and the moving mechanism to thereby shape a three-dimensional shaped object in a shaping region of the shaping table. Within a period in which the three-dimensional shaped object is shaped, the control section controls the ejection-amount adjusting mechanism to thereby stop the ejection of the shaping material from the nozzle and, thereafter, prior to resumption of the ejection of the shaping material from the nozzle to the shaping region, controls the melting section and the ejection-amount adjusting mechanism to thereby execute material purge processing for discharging the shaping material remaining in the melting section to a region different from the shaping region.

With the three-dimensional shaping apparatus in this form, when the ejection of the shaping material from the nozzle is resumed after being stopped, prior to resumption of the ejection of the shaping material to the shaping region, the shaping material remaining between the melting section and the nozzle is discharged. Therefore, it is possible to suppress deterioration in the quality of the three-dimensional shaped object.

(2) In the three-dimensional shaping apparatus in the form, the material may include thermoplastic resin, the control section may execute the material purge processing when a standby time decided according to a glass transition point of the thermoplastic resin elapses after stopping the ejection of the shaping material from the nozzle by controlling the ejection-amount adjusting mechanism, and length of the standby period decided according to a glass transition point of second thermoplastic resin lower than a glass transition point of first thermoplastic resin may be smaller than length of the standby period decided according to the glass transition point of the first thermoplastic resin.

With the three-dimensional shaping apparatus in this form, the remaining shaping material is discharged earlier as a glass transition point serving as an index of heat resistance of the shaping material is lower. Therefore, it is possible to more surely suppress deterioration in the quality of the three-dimensional shaped object.

(3) The three-dimensional shaping apparatus in the form may further include a purge-material supplying mechanism configured to supply a purge material to the melting section, and, in the material purge processing, the control section may control the moving mechanism and the purge-material supplying mechanism to thereby supply the purge material to the melting section and discharge, using the purse material, the shaping material remaining in the melting section to the region different from the shaping region.

With the three-dimensional shaping apparatus in this form, in the material purge processing, the shaping material remaining between the melting section and the nozzle is replaced with the purge material. Therefore, it is possible to suppress the shaping material from remaining between the melting section and the nozzle. It is possible to clean the melting section to the nozzle with the purge material.

(4) The three-dimensional shaping apparatus in the form may further include an air supplying mechanism configured to supply compressed air to between the ejection-amount adjusting mechanism and the nozzle in the first channel, and, in the material purge processing, prior to discharging the shaping material remaining in the melting section, the control section may control the air supplying mechanism to thereby discharge, using the compressed air, the shaping material remaining in the first channel to the region different from the shaping region.

With the three-dimensional shaping apparatus in this form, in the material purge processing, prior to the discharge of the shaping material remaining in the melting section, the shaping material remaining between the first channel and the nozzle is replaced with air. Therefore, it is possible to suppress the shaping material from remaining between the first channel and the nozzle. It is possible to suppress occurrence of clogging of the nozzle.

(5) In the three-dimensional shaping apparatus in the form, the melting section may include a screw including a groove and a heating section configured to heat the material, the melting section melting the material into the shaping material with the rotation of the screw and the heating by the heating section, and the control section may stop the rotation of the screw after stopping the ejection of the shaping material from the nozzle and before or after discharging the shaping material remaining in the melting section to the region different from the shaping region.

With the three-dimensional shaping apparatus in this form, it is possible to suppress denaturation of the shaping material in the melting section by stopping the rotation of the screw.

(6) In the three-dimensional shaping apparatus in the form, the melting section may include, as the screw, a flat screw including a groove forming surface on which the groove is formed and include a barrel including a screw counter surface opposed to the groove forming surface, a communication hole communicating with the first channel being formed in a center of the screw counter surface, and the heating section, and may melt the material into the shaping material with rotation of the flat screw and heating by the heating section and supply the shaping material from the communication hole to the first channel.

With the three-dimensional shaping apparatus in this form, since the shaping material is melted by a small flat screw, it is possible to reduce the three-dimensional shaping apparatus in size.

(7) In the three-dimensional shaping apparatus in the form, the control section may stop the heating by the heating section after stopping the ejection of the shaping material from the nozzle and before or after discharging the shaping material remaining in the melting section to the region different from the shaping region.

With the three-dimensional shaping apparatus in this form, it is possible to suppress denaturation of the shaping material in the melting section by stopping the heating of the material by the heating section.

(8) According to a second form of the present disclosure, a three-dimensional shaping apparatus is provided. The three-dimensional shaping apparatus includes: a melting section including a screw that has a groove, the melting section melting at least a part of a material into a shaping material with rotation of the screw; a first channel communicating with the melting section, the shaping material flowing through the first channel; a nozzle communicating with the first channel and configured to eject the shaping material; an ejection-amount adjusting mechanism provided in the first channel and configured to adjust an ejection amount of the shaping material from the nozzle; a shaping table on which the shaping material ejected from the nozzle is stacked; a moving mechanism configured to change relative positions of the nozzle and the shaping table; and a control section configured to control the melting section, the ejection-amount adjusting mechanism, and the moving mechanism to thereby shape a three-dimensional shaped object in a shaping region of the shaping table. Within a period in which the three-dimensional shaped object is shaped, the control section stops the rotation of the screw after stopping the ejection of the shaping material from the nozzle by controlling the ejection-amount adjusting mechanism and before resuming the ejection of the shaping material from the nozzle to the shaping region.

With the three-dimensional shaping apparatus in this form, when the ejection of the shaping material from the nozzle is resumed after being stopped, it is possible to suppress denaturation of the shaping material in the melting section by stopping the rotation of the screw. Therefore, it is possible to suppress deterioration in the quality of the three-dimensional shaped object.

(9) According to a third form of the present disclosure, a three-dimensional shaping apparatus is provided. The three-dimensional shaping apparatus includes: a melting section including a heating section that heats a material, the melting section melting at least a part of the material into a shaping material with heating by the heating section; a first channel communicating with the melting section, the shaping material flowing through the first channel; a nozzle communicating with the first channel and configured to eject the shaping material; an ejection-amount adjusting mechanism provided in the first channel and configured to adjust an ejection amount of the shaping material from the nozzle; a shaping table on which the shaping material ejected from the nozzle is stacked; a moving mechanism configured to change relative positions of the nozzle and the shaping table; and a control section configured to control the melting section, the ejection-amount adjusting mechanism, and the moving mechanism to thereby shape a three-dimensional shaped object in a shaping region of the shaping table. Within a period in which the three-dimensional shaped object is shaped, the control section stops the heating of the material by the heating section after stopping the ejection of the shaping material from the nozzle by controlling the ejection-amount adjusting mechanism and before resuming the ejection of the shaping material from the nozzle to the shaping region.

With the three-dimensional shaping apparatus in this form, when the ejection of the shaping material from the nozzle is resumed after being stopped, it is possible to suppress denaturation of the shaping material in the melting section by stopping the heating of the material by the heating section. Therefore, it is possible to suppress deterioration in the quality of the three-dimensional shaped object.

The present disclosure can be realized in various forms other than the three-dimensional shaping apparatus. For example, the present disclosure can be realized in forms such as a control method for the three-dimensional shaping apparatus and a purging method for the shaping material.

What is claimed is:

1. A three-dimensional shaping apparatus comprising:
   a melting section configured to melt a material into a shaping material;
   a first channel through which the shaping material flows, the first channel extending along a first direction, the first channel having first and second ends outwardly opposite to each other along the first direction, the first end being connected to the melting section;
   a nozzle connected to the second end of the first channel and configured to eject the shaping material;
   an ejection-amount adjusting mechanism provided in the first channel and configured to adjust an ejection amount of the shaping material from the nozzle;
   a suction member configured to suck the shaping material in the first channel, the suction member being located between the nozzle and the ejection-amount adjusting mechanism in the first channel along the first direction;
   a shaping table on which the shaping material ejected from the nozzle is stacked;
   a moving mechanism configured to change relative positions of the nozzle and the shaping table;
   a memory configured to store a program; and
   a processor configured to execute the program so as to control the melting section, the ejection-amount adjusting mechanism, the moving mechanism, and the suction member to shape a three-dimensional shaped object in a shaping region of the shaping table, wherein
   the processor is configured to control the ejection-amount adjusting mechanism to stop the ejection of the shaping material from the nozzle and control the suction member to suck the shaping material remaining in the first channel between the ejection-amount adjusting mechanism and the nozzle.

2. The three-dimensional shaping apparatus according to claim 1, wherein
   the ejection-amount adjusting mechanism includes a driving shaft and a valve body that rotates according to a rotation of the driving shaft,
   the driving shaft is disposed such that a direction along a center axis of the driving shaft crosses the first direction, and
   the valve body is disposed in the first channel.

3. The three-dimensional shaping apparatus according to claim 1, wherein the suction member includes a cylinder coupled to the first channel, a plunger housed in the cylinder, and a plunger driver that drives the plunger.

4. The three-dimensional shaping apparatus according to claim 1, wherein
   when stopping the ejection of the shaping material from the nozzle, the processor is configured to control the ejection-amount adjusting mechanism to stop the ejection of the shaping material from the nozzle, thereafter control the suction member to suck the shaping material remaining in the first channel between the ejection-amount adjusting mechanism and the nozzle.

5. The three-dimensional shaping apparatus according to claim 1, wherein the melting section includes a screw including a groove and a heater configured to heat the material, and the melting section is configured to melt the material into the shaping material with rotation of the screw and heat from the heater, and the processor is configured to stop the rotation of the screw after stopping the ejection of the shaping material from the nozzle and before or after the discharging the shaping material remaining in the melting section to a region different from the shaping region.

6. The three-dimensional shaping apparatus according to claim 5, wherein the melting section includes, as the screw, a flat screw including a groove forming surface on which the groove is formed and includes a barrel including a screw counter surface opposed to the groove forming surface, a communication hole communicating with the first channel is formed in a center of the screw counter surface, and the melting section is configured to melt the material into the shaping material with the rotation of the flat screw and the heat from the heater, and supply the shaping material from the communication hole to the first channel.

7. The three-dimensional shaping apparatus according to claim 1, wherein the melting section includes a screw including a groove and a heater configured to heat the material, and the melting section is configured to melt the material into the shaping material with rotation of the screw and heat from the heater, and the processor is configured to stop heating by the heater after stopping the ejection of the shaping material from the nozzle and before or after the discharging the shaping material remaining in the melting section to a region different from the shaping region.

8. The three-dimensional shaping apparatus according to claim 1, further comprising a nozzle heater that heats the nozzle, the melting section includes a screw including a groove and a heater configured to heat the material, and the melting section is configured to melt the material into the shaping material with rotation of the screw and heat from the heater, and the processor is configured to control the nozzle heater and the heater of the melting section such that a temperature of the nozzle heater is higher than a temperature of the heater of the melting section.

\* \* \* \* \*